US012631764B2

(12) United States Patent
Ishino et al.

(10) Patent No.: US 12,631,764 B2
(45) Date of Patent: May 19, 2026

(54) WORK VEHICLE

(71) Applicant: Yanmar Holdings Co., Ltd., Osaka (JP)

(72) Inventors: Tatsuya Ishino, Okayama (JP); Yohei Nakagawa, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 442 days.

(21) Appl. No.: 17/899,514

(22) Filed: Aug. 30, 2022

(65) Prior Publication Data

US 2023/0076382 A1     Mar. 9, 2023

(30) Foreign Application Priority Data

Aug. 31, 2021    (JP) ................................. 2021-141517

(51) Int. Cl.
| | |
|---|---|
| *G01S 19/36* | (2010.01) |
| *A01B 76/00* | (2006.01) |
| *A01B 79/00* | (2006.01) |
| *B60R 16/02* | (2006.01) |
| *B62D 49/06* | (2006.01) |
| *H04B 7/185* | (2006.01) |

(52) U.S. Cl.
CPC .............. *G01S 19/36* (2013.01); *A01B 76/00* (2013.01); *A01B 79/005* (2013.01); *B60R 16/0207* (2013.01); *B62D 49/06* (2013.01); *H04B 7/18517* (2013.01)

(58) Field of Classification Search
USPC ........................................ 296/180.2, 190.08
See application file for complete search history.

(56) References Cited

U.S. PATENT DOCUMENTS

| | | | | |
|---|---|---|---|---|
| 2,785,002 A | * | 3/1957 | Schumaker ........... | B60R 21/131 |
| | | | | 280/756 |
| 11,186,312 B2 | * | 11/2021 | Nishi ........................ | B62D 5/08 |
| 11,221,630 B2 | * | 1/2022 | Nishi ........................ | G08G 1/00 |
| 11,383,703 B2 | * | 7/2022 | Nishi .................... | G05D 1/0255 |
| 11,529,920 B2 | * | 12/2022 | Misaki .................... | B60R 11/02 |

(Continued)

FOREIGN PATENT DOCUMENTS

| | | |
|---|---|---|
| EP | 2246485 A1 | 11/2010 |
| JP | 2018184100 A | 11/2018 |

(Continued)

OTHER PUBLICATIONS

Translation of WO2018135234 (Year: 2018).*

(Continued)

*Primary Examiner* — Amy R Weisberg
*Assistant Examiner* — Veronica M Condo
(74) *Attorney, Agent, or Firm* — NORTON ROSE FULBRIGHT US LLP

(57) ABSTRACT

The work vehicle includes a vehicle body, a cabin mounted on the vehicle body and having a roof, and a positioning device located above the cabin and configured to detect a position of the vehicle body on the basis of a signal transmitted from a positioning satellite. The roof has a roof front end located in a forefront portion in a front-rear direction; and a roof uppermost end located behind the roof front end and located higher than the roof front end. A position of the positioning device is lower than the roof uppermost end.

12 Claims, 8 Drawing Sheets

(56) References Cited

U.S. PATENT DOCUMENTS

| | | | | |
|---|---|---|---|---|
| 11,780,499 B2 * | 10/2023 | Kobayashi | ............. | B62D 25/16 |
| | | | | 701/41 |
| 11,871,690 B2 * | 1/2024 | Nishikubo | ............. | G05D 1/024 |
| 11,884,141 B2 * | 1/2024 | Horai | ...................... | B60R 21/11 |
| 11,904,777 B2 * | 2/2024 | Ishino | ................... | A01B 76/00 |
| 11,912,205 B2 * | 2/2024 | Takase | ................... | G05D 1/248 |
| 11,951,910 B2 * | 4/2024 | Misaki | ................ | H01Q 1/3275 |
| 2019/0248421 A1 * | 8/2019 | Jacobsthal | ............. | B62D 25/06 |
| 2019/0317521 A1 * | 10/2019 | Nishi | ................... | G05D 1/0276 |

FOREIGN PATENT DOCUMENTS

| | | | | | |
|---|---|---|---|---|---|
| JP | 2019070544 A | | 5/2019 | | |
| JP | 6716763 B1 * | | 7/2020 | ........... | H01Q 1/3275 |
| JP | 2021-041745 A | | 3/2021 | | |
| WO | WO-2018135234 A1 * | | 7/2018 | ........... | A01B 69/008 |
| WO | WO-2019069779 A1 * | | 4/2019 | ............. | B62D 49/00 |
| WO | WO-2019124258 A1 * | | 6/2019 | ............. | B60R 11/02 |
| WO | WO-2019142506 A1 * | | 7/2019 | ............. | A01B 69/00 |
| WO | WO-2020129961 A1 * | | 6/2020 | ............. | B60R 11/02 |
| WO | WO-2020129969 A1 * | | 6/2020 | ............. | B60R 1/006 |
| WO | WO-2021131670 A1 * | | 7/2021 | ............. | G05D 1/248 |

OTHER PUBLICATIONS

Translation of WO2021131670 (Year: 2021).*
Translation of WO2020129969 (Year: 2020).*
Translation of WO2019142506 (Year: 2019).*
Translation of JP 6716763 Description (Year: 2020).*
Translation of WO 2019069779 Description (Year: 2019).*
Translation of WO 2019124258 Description (Year: 2019).*
European Search Report dated Jan. 23, 2023 issued for EP Application No. 22192659.5.

* cited by examiner

WORK VEHICLE

CROSS-REFERENCE TO RELATED APPLICATIONS

This application is claims priority under 35 U.S.C. § 119 to JP Application No. 2021-141517 filed Aug. 31, 2021, the entire contents of which are hereby incorporated by reference.

TECHNICAL FIELD

The present invention relates to a work vehicle such as a tractor.

BACKGROUND ART

Conventionally, a technique of providing a positioning device above a cabin of a tractor has been proposed, the positioning device detecting a position of a vehicle body (for example, see Patent Document 1).

PRIOR ART DOCUMENT

Patent Document

Patent Document 1: Japanese Unexamined Patent Application Publication No. 2021-041745

SUMMARY OF INVENTION

Technical Problem

In the tractor disclosed in Patent Document 1, a cabin roof is horizontal. Thus, when the positioning device is installed above the cabin, the positioning device protrudes above the cabin roof. As a result, when the tractor travels in an installed state of the positioning device, depending on a circumstance, the positioning device possibly comes into contact with an obstacle and is damaged. For example, when the tractor is stored in a barn, the positioning device above the cabin possibly comes into contact with an upper portion of a doorway of the barn and is damaged.

In order to avoid the damage caused by the contact of the positioning device with the obstacle, for example, it is considered to rotate the positioning device and changing a position thereof to a low position or perform work of removing the positioning device. However, in these cases, cumbersome work of changing the position of the positioning device or removing the positioning device is required, which increases a workload of a user. Therefore, certain improvement is necessary for installation of the positioning device.

The present invention has been made to solve the above problem and therefore has a purpose of providing a work vehicle capable of reducing a risk that a positioning device located above a cabin comes into contact with an obstacle and is damaged and capable of reducing a workload of a user.

Solution to Problem

A work vehicle according to one aspect of the present invention is a work vehicle that includes: a vehicle body; and a cabin that is mounted on the vehicle body and has a roof, and includes a positioning device that is located above the cabin and detects a position of the vehicle body on the basis of a signal transmitted from a positioning satellite. The roof has: a roof front end that is located in a forefront portion in a front-rear direction; and a roof uppermost end that is located behind the roof front end and is located higher than the roof front end, and a position of the positioning device is lower than a position of the roof uppermost end.

Advantageous Effects of Invention

According to the above configuration, it is possible to reduce a risk that the positioning device located above the cabin comes into contact with an obstacle and is damaged and to reduce a workload of a user.

BRIEF DESCRIPTION OF DRAWINGS

FIG. 7 is a perspective view of the cabin in a state where the antenna unit illustrated in FIG. 6 is not illustrated.

FIG. 10 is a cross-sectional view of a fastening unit that is used when only an outer roof is fixed to a fixing frame.

DESCRIPTION OF EMBODIMENTS

The following is a description of an embodiment of the present invention based on the drawings. In this embodiment, a tractor will be described as an example of a work vehicle. In addition to the tractor, the examples of the work vehicle are riding work machines such as a rice transplanter, a combine harvester, a civil engineering and construction work device, and a snowplow.

In the present specification, directions will be defined as follows. First, a direction in which the tractor as the work vehicle advances during work is set as "front", and a reverse direction thereof is set as "rear". A right side of the advancing direction of the tractor is set as right, and a left side thereof is set as left. A perpendicular direction to the front-rear direction and the right-left direction of the tractor is set as an up-down direction. At this time, a direction of a gravitational force is set as down, and an opposite side thereof is set as up.

[1. Overview of Vehicle Travel System]

Figure 1:
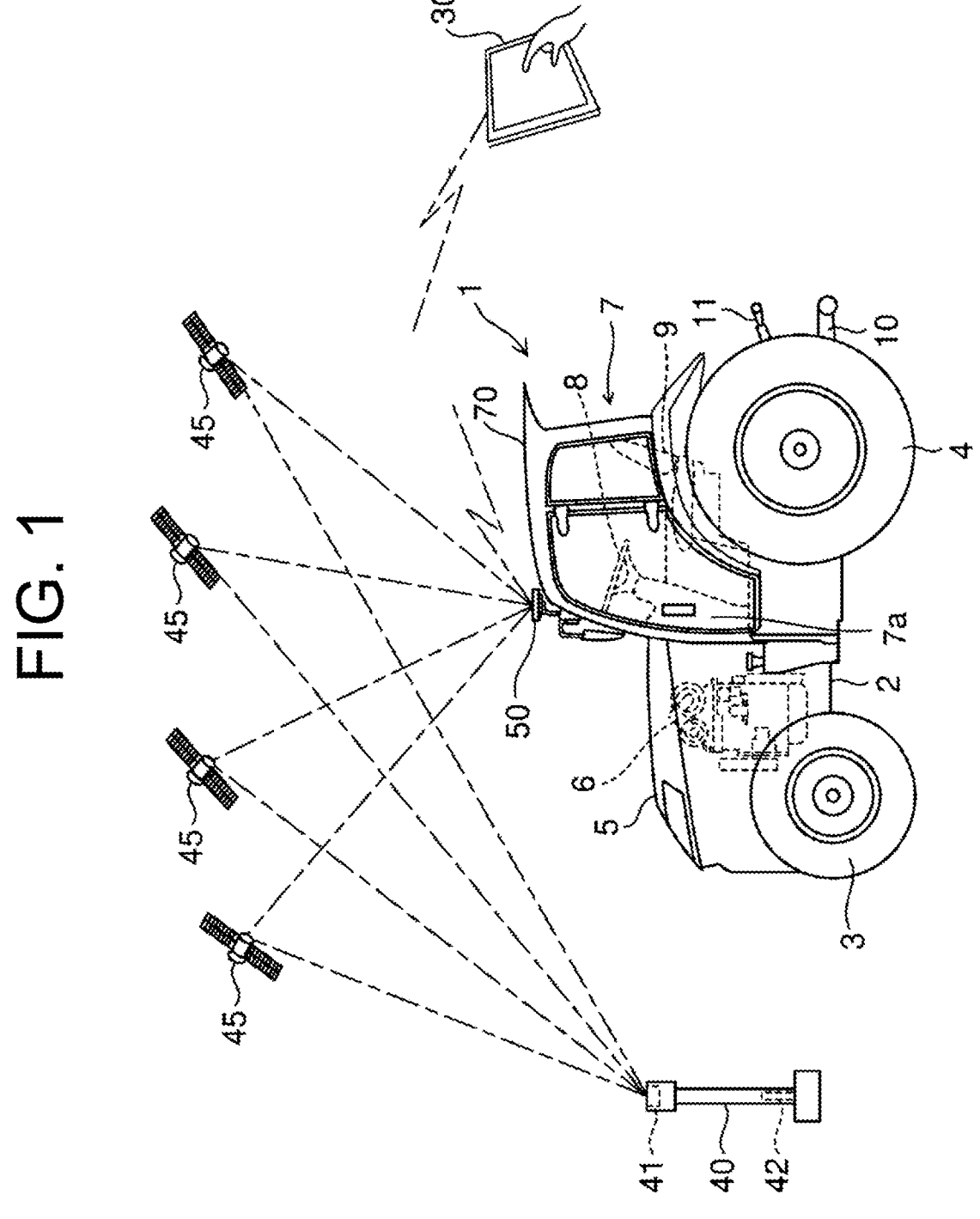
FIG. 1 is a side view illustrating an outline configuration of a tractor as an example of a work vehicle according to an embodiment of the present invention.
Figure 2:
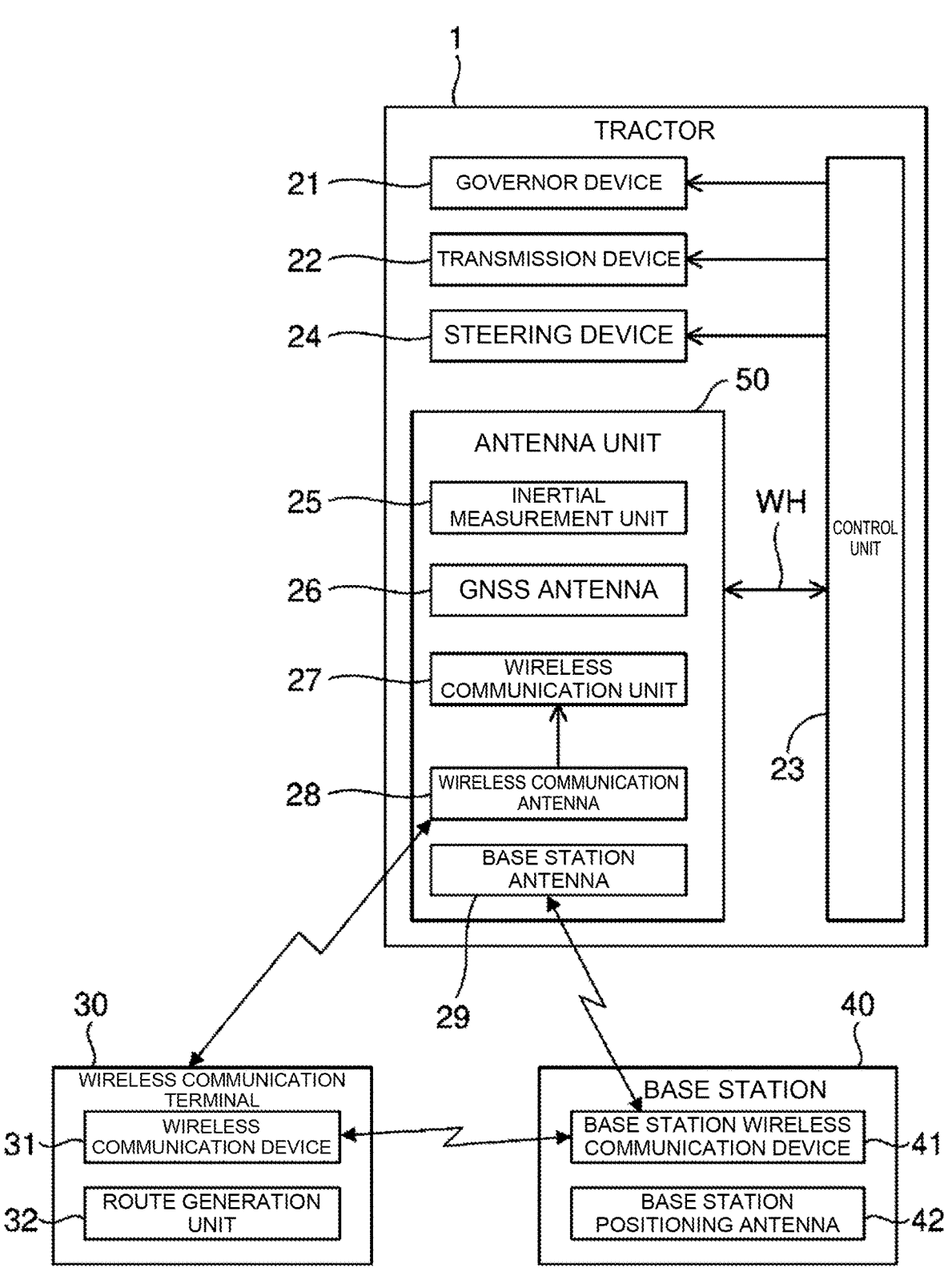
FIG. 2 is a block diagram of a vehicle travel system including the tractor.

FIG. 1 is a side view illustrating a schematic configuration of a tractor 1 as an example of the work vehicle in this embodiment. FIG. 2 is a block diagram of a vehicle travel system including the tractor 1.

As illustrated in FIG. 2, the vehicle travel system in this embodiment is configured to have the tractor 1, a wireless communication terminal 30, and a base station 40. The tractor 1 can travel according to maneuvering by a driver or can travel autonomously on the basis of an instruction from the wireless communication terminal 30, or the like. The wireless communication terminal 30 is a terminal that gives the various instructions and the like to the tractor 1. The base station 40 is provided to obtain position information of the tractor 1.

As illustrated in FIG. 1, the tractor 1 includes a vehicle body 2. A ground work machine (not illustrated) can be attached to a rear side of the vehicle body 2. For example, a cultivator, a plow, or a fertilizing device can be used as the ground work machine. However, the ground work machine is not limited to these.

A front portion of the vehicle body 2 is supported by a right and left pair of front wheels 3. A rear portion of the vehicle body 2 is supported by a right and left pair of rear wheels 4. A hood 5 is arranged in the front portion of the vehicle body 2. An engine 6 as a drive source is arranged under the hood 5. The engine 6 is a diesel engine, for example. However, the engine 6 is not limited thereto and may be a gasoline engine, for example. In addition to or instead of the engine 6, an electric motor may be used as the drive source.

A cabin 7 which a manipulator (the driver) gets in is provided in an upper portion of the vehicle body 2 behind the hood 5. A door 7a that rotates and opens to the front is provided on a left side of the cabin 7. The driver can gets in and out of the cabin 7 by opening and closing the door 7a. The door 7a may be provided on a right side of the cabin 7.

The cabin 7 has a roof 70. That is, the tractor 1 as the work vehicle includes the vehicle body 2 and the cabin 7 that is mounted on the vehicle body 2 and has the roof 70. In the cabin 7, a steering wheel 8 for the driver to perform a steering operation and a driver's seat 9 for the driver are provided.

A three-point linkage mechanism is provided on the rear side of the vehicle body 2. The three-point linkage mechanism is configured to include a right and left pair of lower links 10 and an upper link 11. The above ground work machine is configured to be attachable to the three-point linkage mechanism. In addition, a lifting and lowering device (not illustrated) that has a hydraulic unit such as a lifting and lowering cylinder is provided on the rear side of the vehicle body 2. When the lifting and lowering device lifts or lowers the three-point linkage mechanism, the ground work machine can be lifted or lowered, respectively.

As illustrated in FIG. 2, the tractor 1 is provided with: a governor device 21 capable of adjusting a rotational speed of the engine 6; and a transmission device 22 that changes rotational drive power from the engine 6 and transmits the changed rotational drive power to drive wheels. The governor device 21 and the transmission device 22 are controlled by a control unit 23.

The tractor 1 includes a steering device 24. For example, the steering device 24 is provided in an intermediate portion of a rotation shaft of the steering wheel 8, and is configured to be able to adjust a rotation angle (a steering angle) of the steering wheel 8. When the control unit 23 controls the steering device 24, the tractor 1 can make not only straight travel but also turning travel with a desired turning radius by adjusting the rotation angle of the steering wheel 8 to a desired angle.

The tractor 1 further includes an antenna unit 50. The antenna unit 50 is a positioning device that is located above the cabin 7 (particularly, the roof 70) and detects the position of the vehicle body 2 on the basis of a signal transmitted from a positioning satellite (a navigation satellite) 45 illustrated in FIG. 1.

The antenna unit 50 and the control unit 23 are electrically connected to each other by a harness WH.

In this way, various types of information and an instruction can be transmitted between the antenna unit 50 and the control unit 23 via the harness WH. For example, position information of the vehicle body 2, which is detected by the antenna unit 50, is input to the control unit 23 via the harness WH. From the above, it can be said that the tractor 1 includes the control unit 23 that receives the position information of the vehicle body 2, which is detected by the antenna unit 50, via the harness WH 23.

Next, a detailed description will be made on the antenna unit 50 described above. The antenna unit 50 has an inertial measurement unit (IMU) 25, a global navigation satellite system (GNSS) antenna 26, a wireless communication unit 27, a wireless communication antenna 28, and a base station antenna 29.

The IMU 25 includes a three-axis gyroscope sensor and a three-directional accelerometer and thereby detects a three-dimensional angular velocity and three-dimensional acceleration. Detected values by the IMU 25 are input to the control unit 23. The control unit 23 can calculate posture information of the tractor 1 on the basis of the detected values. The posture information includes information on an azimuth angle (a yaw angle) of the vehicle body 2, a right-left tilt angle (a roll angle) of the vehicle body 2, and a front-rear tilt angle (a pitch angle) of the vehicle body 2, for example.

The GNSS antenna 26 receives a radio signal that is transmitted from the positioning satellite 45, and the positioning satellite 45 constitutes a Global Navigation Satellite System (GNSS). As the positioning satellite, in addition to the Global Positioning System (GPS), the Quasi-Zenith Satellite System (Japan), the Global Navigation Satellite System (Russia), or the like can be used for the GNSS.

The wireless communication unit 27 exchanges various signals with the wireless communication terminal 30 and the like via a wireless communication network that is created with the wireless communication terminal 30 and the like. In this embodiment, the wireless communication unit 27 is constructed of a Wi-Fi® unit with the 2.4 GHz frequency band.

The signal transmitted from the wireless communication terminal 30 is received by the wireless communication antenna 28 and is then input to the control unit 23 via the wireless communication unit 27. Meanwhile, the signal from the control unit 23 is transmitted to a wireless communication device 31 of the wireless communication terminal 30 and the like via the wireless communication unit 27 and the wireless communication antenna 28.

Here, as a positioning method using the GNSS, Real-time kinematic (RTK) positioning is used in this embodiment, for example. In the RTK positioning, a carrier phase (satellite positioning information) from the positioning satellite 45 is measured by both of the base station positioning antenna 42 of the base station 40, which is installed at a reference point, and the GNSS antenna 26 of the tractor 1, which serves as a mobile station for calculating position information of a target. Every time the base station 40 measures the satellite positioning information from the positioning satellite 45 or every time a set period elapses, the base station 40 generates correction information. The correction information is transmitted from a base station wireless communication device 41 to the base station antenna 29 of the tractor 1. The control unit 23 of the tractor 1 corrects the satellite positioning information, which is measured by the GNSS antenna 26, by using the correction information transmitted from the base station 40 so as to calculate the current position information of the tractor 1. The control unit 23 calculates, as the current position information of the tractor 1, latitude information and longitude information, for example.

The positioning method to be used is not limited to the RTK positioning described above, and another positioning method such as differential GPS positioning (DGPS) may be used. In addition, the base station 40 can exchange the various types of the information not only with the tractor 1 but also with the wireless communication terminal 30.

The wireless communication terminal 30 is constructed of a tablet-type personal computer with a touch panel, for example. The wireless communication terminal 30 is provided with the wireless communication device 31 and a route generation unit 32 that generates a target travel route. The route generation unit 32 can generate the target travel route for the autonomous travel of the tractor 1 on the basis of various types of information input to the touch panel. The route generation unit 32 is constructed of a central processing unit (CPU) provided in the personal computer, for example.

The wireless communication terminal 30 transmits, to the tractor 1, the various types of the information for the autonomous travel of the tractor 1, and an example of the various types of the information is the target travel route. The control unit 23 of the tractor 1 calculates the current position information of the tractor 1 from the signal received by the GNSS antenna 26, calculates displacement information and orientation information of the vehicle body 2 from the detected values by the IMU 25, and controls the transmission device 22, the steering device 24, and the like on the basis of these pieces of the information. In this way, the control unit 23 can make the tractor 1 travel autonomously along the target travel route, which is generated by the route generation unit 32.

[2. Regarding Antenna Unit Installation Method (Part 1)]

Figure 3:
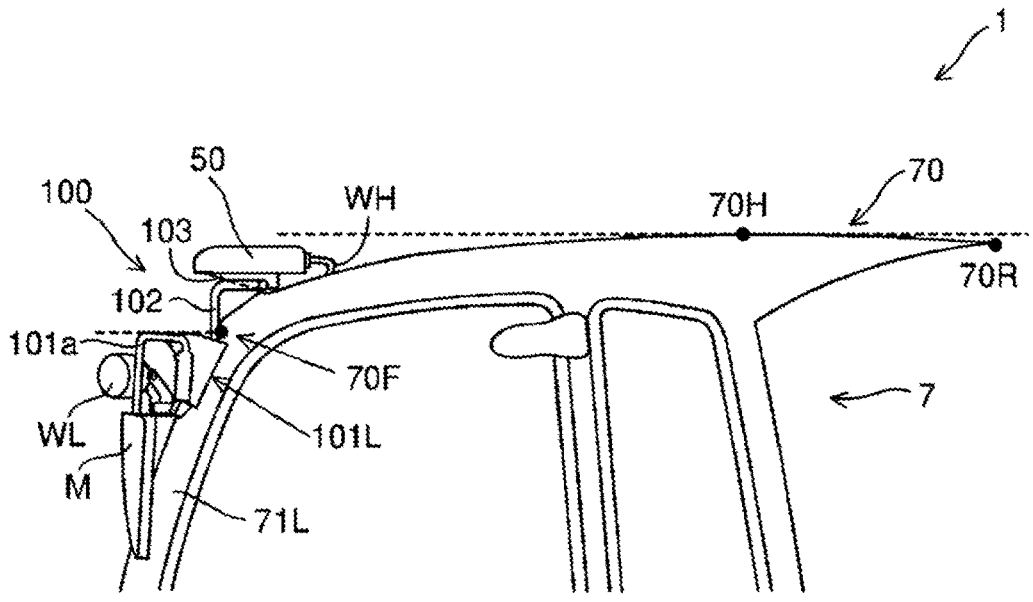
FIG. 3 is a side view of an upper portion of a cabin of the tractor.
Figure 4:
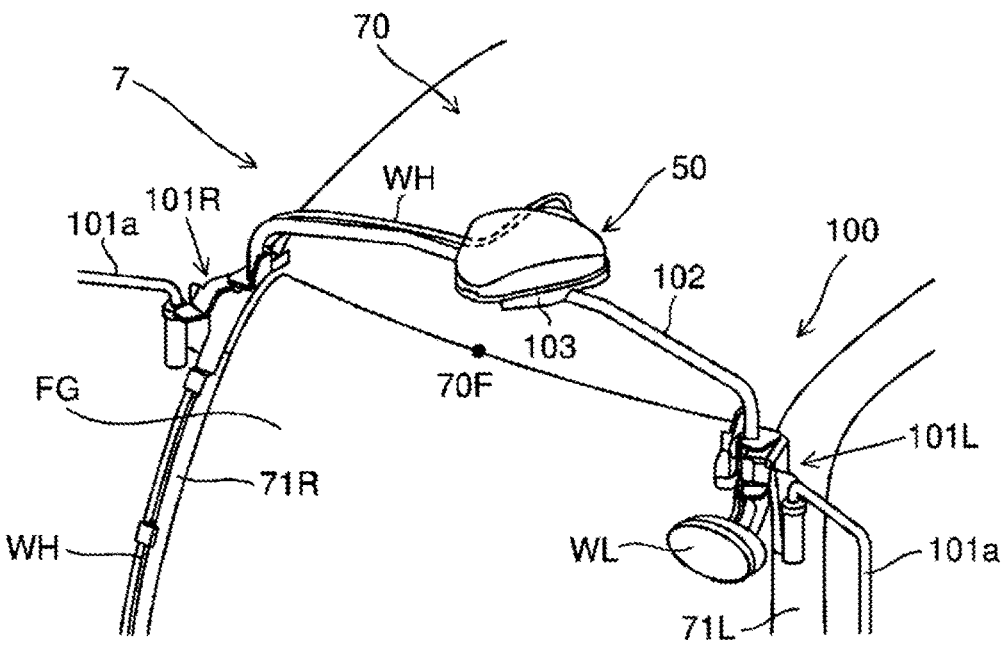
FIG. 4 is a perspective view at the time when the cabin is seen from above.

Next, a description will be made on an installation method for the antenna unit 50 described above. FIG. 3 is a side view of an upper portion of the cabin 7 of the tractor 1. FIG. 4 is a perspective view at the time when the cabin 7 of the tractor 1 is seen from above. First, a description will be made on a shape of the roof 70 of the cabin 7.

The roof 70 of the cabin 7 has a roof front end 70F. The roof front end 70F is located on a forefront side of the roof 70 in the front-rear direction. That is, the roof 70 has the roof front end 70F that is located in a forefront portion in the front-rear direction.

In detail, the cabin 7 has a right front pillar 71R and a left front pillar 71L. The right front pillar 71R and the left front pillar 71L are coupled to the vehicle body 2 and respectively support a right front portion and a left front portion of the roof 70. That is, the cabin 7 has: the right front pillar 71R that is coupled to the vehicle body 2 and supports the right front portion of the roof 70; and the left front pillar 71L that is coupled to the vehicle body 2 and supports the left front portion of the roof 70. The roof front end 70F described above is located on a forefront side in a peripheral edge portion of the roof 70 that connects upper ends of the right front pillar 71R and the left front pillar 71L.

In this embodiment, the cabin 7 has front windshield FG in front of the driver's seat 9 (see FIG. 1). In this configuration, in the roof 70, the roof front end 70F matches a forefront position that is in contact with an upper edge of the front windshield FG.

The cabin 7 does not always have to have the front windshield FG. Even in a configuration that the cabin 7 does not have a front windshield, a portion located on the forefront side in the peripheral edge portion of the roof 70, which connects the upper ends of the right front pillar 71R and the left front pillar 71L, is the roof front end 70F.

The roof 70 of the cabin 7 further has a roof uppermost end 70H. The roof uppermost end 70H is a portion that is located the highest of the roof 70. This roof uppermost end 70H is located behind the roof front end 70F. In this embodiment, the roof uppermost end 70H is located slightly behind a central portion of the roof 70 in the front-rear direction. However, the position of the roof uppermost end 70H is not limited to the above position. For example, in the front-rear direction, the position of the roof uppermost end 70H may match a position of a roof rear end 70R that is located on the rearmost side of the roof 70. In any case, the roof 70 has such a shape (a streamline shape) that a roof upper surface is inclined downward to the front from the roof uppermost end 70H. Just as described, the roof 70 has the roof uppermost end 70H that is located behind the roof front end 70F and is located higher than the roof front end 70F.

As illustrated in FIG. 3, at a position above the cabin 7 (particularly, the roof 70), a position of the antenna unit 50 as the positioning device is lower than the roof uppermost end 70H. The antenna unit 50 can be located at such a position by using a support mechanism 100, a support stay 200 (see FIG. 5), or the like. The support mechanism 100 and the like will be described in detail below.

In the tractor 1 of this embodiment, the roof 70 of the cabin 7 is not horizontal and has the roof uppermost end 70H that is located higher than the roof front end 70F. For this reason, the antenna unit 50 can be installed at a position above the cabin 7 and lower than the roof uppermost end 70H. At such a position of the antenna unit 50, the antenna unit 50 is not projected above the roof uppermost end 70H. Thus, even in the case where the tractor 1 travels in a state where the antenna unit 50 is installed above the cabin 7, there is no possibility that the antenna unit 50 collides with an obstacle therearound. In this way, it is possible to reduce damage to the antenna unit 50, which is caused by contact with the obstacle. In addition, it is possible to eliminate cumbersome work that a user (for example, the driver of the tractor 1) removes the antenna unit 50 from the cabin 7 or changes the position of the antenna unit 50 to a lower position by rotation or the like in order to avoid the contact of the antenna unit 50 with the obstacle. Thus, it is also possible to reduce the user's workload.

The followings are considered as examples of the obstacle: (1) an upper portion of a doorway of a barn at the time of storing the tractor 1 in the barn; (2) a roof of a truck bed at the time when the tractor 1 is placed on the truck bed (with the roof) of a truck for transportation of the tractor 1; and (3) a lower portion of an elevated railroad or the like at the time when the tractor 1 travels under the elevated railroad or the like.

In this embodiment, as illustrated in FIG. 3, the antenna unit 50 is located between the roof front end 70F and the roof uppermost end 70H. That is, the position of the antenna unit 50 is higher than the roof front end 70F.

At such a position of the antenna unit 50, it is possible to reduce such a possibility that the antenna unit 50 blocks a front to upper view field of the driver who gets in the cabin 7. As a result, it is possible to secure the driver's favorable view field. That is, it is possible to reduce a chance of occurrence of such a situation where the driver's visibility during the work (maneuvering) worsens due to the installation of the antenna unit 50.

In this embodiment, as illustrated in FIG. 3, the antenna unit 50 is located in front of the roof uppermost end 70H. As described above, in such a roof shape that the position of the roof uppermost end 70H is higher than the position of the roof front end 70F and that is inclined downward to the front from the roof uppermost end 70H, the antenna unit 50 can easily be located at the lower position than the roof uppermost end 70H by positioning the antenna unit 50 in front of the roof uppermost end 70H.

However, in the shape that the roof rear end 70R is lower than the roof uppermost end 70H, the antenna unit 50 can be installed at a position behind the roof uppermost end 70H and lower than the roof uppermost end 70H by appropriately setting a difference in height between the roof uppermost end 70H and the roof rear end 70R.

Next, a detailed description will be made on the support mechanism 100 described above. The tractor 1 includes the support mechanism 100 that supports the antenna unit 50. This support mechanism 100 has a right stay 101R, a left stay 101L, a support pipe 102 as a support member, and a seating 103.

The right stay 101R is attached to the right front pillar 71R. The right stay 101R supports a mirror (not illustrated) via a mirror support rod 101a. The left stay 101L supports a work lamp WL and also supports a mirror M via a mirror support rod 101a. The right stay 101R may also have a work lamp in the same manner as the left stay 101L. Just as described, the support mechanism 100 has the right stay 101R and the left stay 101L, which are respectively attached to the right front pillar 71R and the left front pillar 71L.

The attachment of the right stay 101R to the right front pillar 71R and the attachment of the left stay 101L to the left front pillar 71L are performed by welding, for example, but may be performed by another method such as bolting. In addition, a radio antenna (not illustrated) may detachably be provided to the right stay 101R or the left stay 101L.

The support pipe 102 extends in the right-left direction at a position above the roof 70, and is bent downward near both ends in the right-left direction. The right end of the support pipe 102 is attached to the right stay 101R. The left end of the support pipe 102 is attached to the left stay 101L. The support pipe 102 may be attached to the right stay 101R and the left stay 101L by using fasteners such as bolts or by using dedicated attachment brackets (for example, clamps). In this embodiment, at the position above the roof 70, a central portion of the support pipe 102 in the right-left direction is slightly bent rearward, but may be straight in the right-left direction without being bent.

The seating 103 is located at a position above the roof 70 and in the central portion thereof in the right-left direction, and is fixed to the support pipe 102. The support pipe 102 and the seating 103 are fixed to each other by welding, for example, but may detachably be fixed to each other by using a fastener such as a bolt. The seating 103 supports the antenna unit 50 from below. The antenna unit 50 is fixed to the seating 103 by fastening a bolt, for example.

As described above, the support mechanism 100 has: the support pipe 102 that extends in the right-left direction at the position above the roof 70 and has the ends fixed to the right stay 101R and the left stay 101L; and the seating 103 that is fixed, at the position above the roof 70, to the support pipe 102. Then, the antenna unit 50 is fixed to the seating 103.

In the configuration of the support mechanism 100 described above, the seating 103, to which the antenna unit 50 is fixed, is fixed, at the position above the roof 70, to the support pipe 102. The ends of the support pipe 102 are fixed to the right stay 101R and the left stay 101L. The right stay 101R and the left stay 101L are respectively attached to the right front pillar 71R and the left front pillar 71L. Accordingly, the antenna unit 50 can stably be supported at the position above the roof 70 by fixing the antenna unit 50 to the seating 103. In addition, by using the support mechanism 100, the antenna unit 50 can easily be attached to the tractor 1 later.

As illustrated in FIG. 4, in this embodiment, the harness WH, which electrically connects the antenna unit 50 and the control unit 23 (see FIG. 2), is arranged along the right front pillar 71R. However, the harness WH may be arranged along the left front pillar 71L. That is, the harness WH is arranged along the right front pillar 71R or the left front pillar 71L. In this way, the exposed harness WH can easily be guided (routed) without accentuating the harness WH.

In the case where the door 7a (see FIG. 1) is provided on the left side of the cabin 7 as in this embodiment and the harness WH is arranged along the left front pillar 71L, there is a possibility that the harness WH comes into contact with the door 7a or is pinched by the door 7a at the time of opening/closing the door 7a. From a perspective of avoiding such inconvenience, the harness WH is desirably arranged along the right front pillar 71R. That is, of the right front pillar 71R and the left front pillar 71L, the harness WH is desirably arranged along the pillar that is located on the opposite side of a doorway (the door 7a) of the cabin 7 in the right-left direction.

[3. Regarding Antenna Unit Installation Method (Part 2)]

Figure 5:
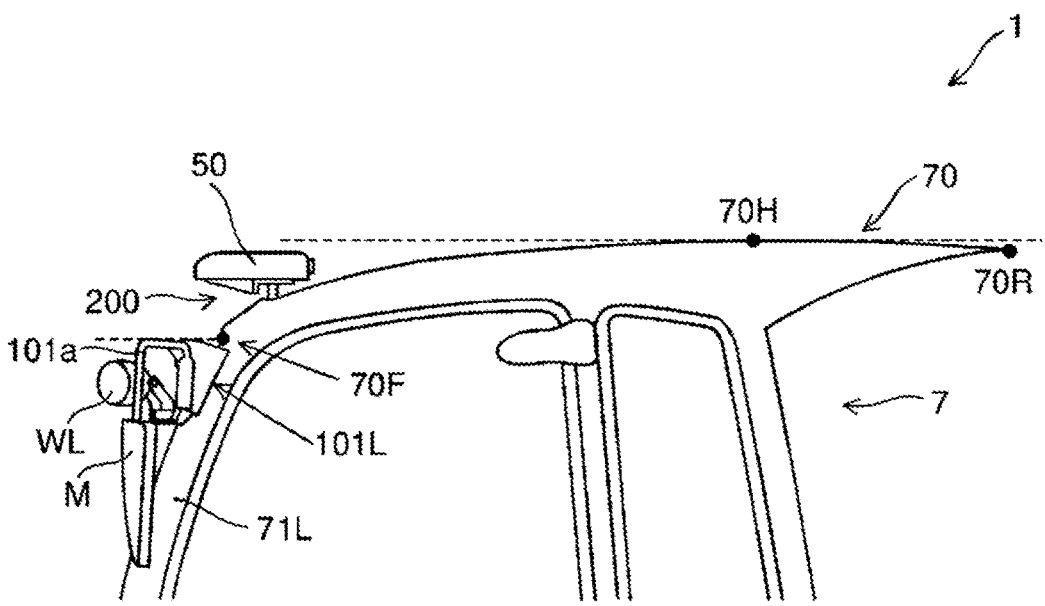
FIG. 5 is a side view of the upper portion of the cabin of the tractor, an antenna unit being installed on a roof of the tractor by using a support stay.

The antenna unit 50 in this embodiment can be fixed to the roof 70 of the cabin 7 by using the support stay 200, which is illustrated in FIG. 5, instead of the above-described support mechanism 100. A description will hereinafter be made on another installation method for the antenna unit 50. Even in the case where the support stay 200 is used, a point that the antenna unit 50 can be located at the position above the cabin 7 and lower than the roof uppermost end 70H is the same as the case where the support mechanism 100 is used.

Figure 6:
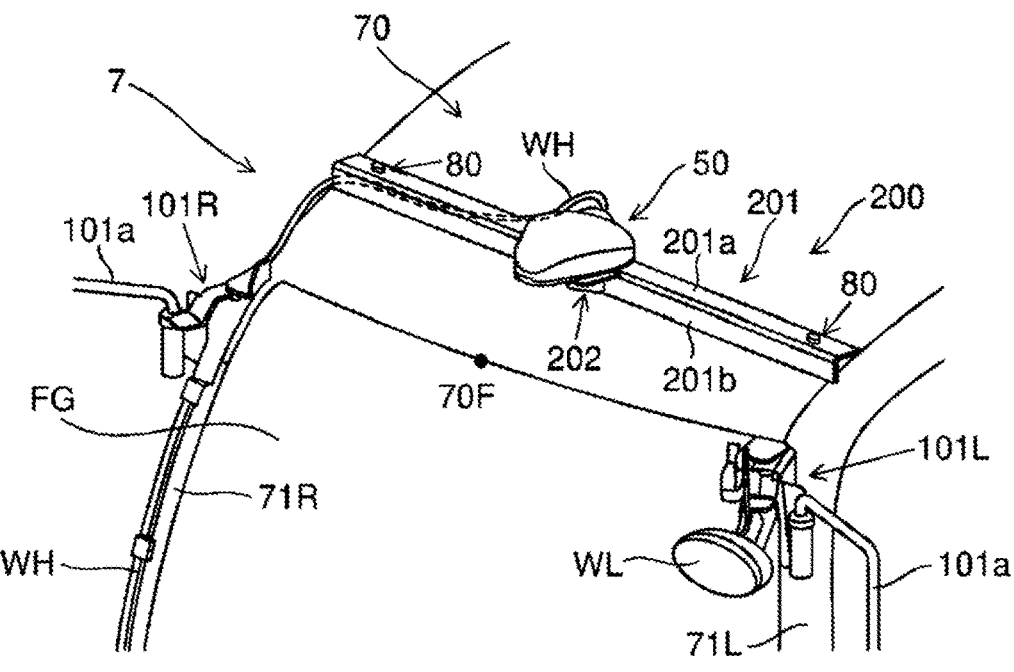
FIG. 6 is a perspective view at the time when the cabin of the tractor in FIG. 5 is seen from above.
Figure 7:
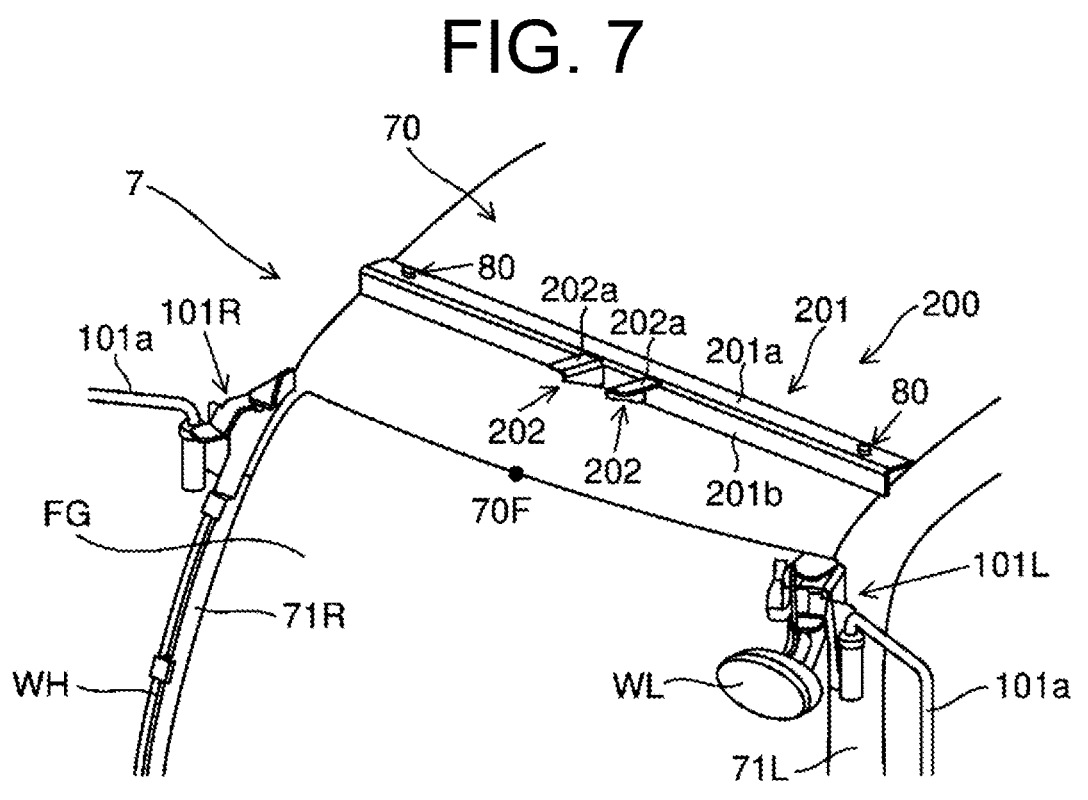

FIG. 5 is a side view of the upper portion of the cabin 7 of the tractor 1, the antenna unit 50 being installed on the roof 70 of the tractor 1 by using the support stay 200. FIG. 6 is a perspective view at the time when the cabin 7 of the tractor 1 in FIG. 5 is seen from above. FIG. 7 is a perspective view of the cabin 7 in a state where the antenna unit 50 in FIG. 6 is not illustrated.

The support stay 200 is fixed to the upper surface of the roof 70 (particularly, an outer roof 703, which will be described below (see FIG. 9)). The support stay 200 is fixed to the roof 70 by using a fastening unit 80, and a detailed description on the fixing method will be made below. The antenna unit 50 is fixed to and supported by the support stay 200 (particularly, a flat plate portion 201a and an auxiliary stay 202, which will be described below) by a bolt or the like. In this way, the antenna unit 50 is located above the roof 70. That is, the tractor 1 includes the support stay 200 that is fixed to the upper surface of the roof 70 and supports the antenna unit 50.

The support stay 200, which supports the antenna unit 50, is fixed to the upper surface of the roof 70. In this way, the antenna unit 50 can stably be located above the roof 70.

The support stay 200 has a stay body 201 and the auxiliary stay 202. The stay body 201 is formed to be elongated in the right-left direction and is located above the roof 70. That is, the support stay 200 has the stay body 201 that extends in the right-left direction at a position above the roof 70.

The stay body 201 has the flat plate portion 201*a* and a hanging portion 201*b*. The flat plate portion 201*a* is formed to be elongated in the right-left direction, and a central portion thereof in the right-left direction supports the antenna unit 50 from below. The hanging portion 201*b* is formed to be elongated in the right-left direction, and is formed to hang down from a front end portion 201*a*1 (see FIG. 8) of the flat plate portion 201*a*. As a result, the stay body 201 has an inverted L-shape in the side view. However, the hanging portion 201*b* may be formed to hang down from a rear end portion 201*a*2 (see FIG. 8) of the flat plate portion 201*a*. The stay body 201, which has the flat plate portion 201*a* and the hanging portion 201*b*, can be formed by bending a metal plate at 90°. However, the stay body 201 may be formed by coupling the flat plate portion 201*a* and the hanging portion 201*b* by welding or the like.

Just as described, the stay body 201 has: the flat plate portion 201*a* that extends in the right-left direction and supports the antenna unit 50 from below; and the hanging portion 201*b* that extends in the right-left direction and hangs down from the front end portion 201*a*1 or the rear end portion 201*a*2 of the flat plate portion 201*a*.

The auxiliary stay 202 is fixed to a front side of the hanging portion 201*b* by welding or the like in order to assist the stay body 201 with support of the antenna unit 50. The auxiliary stay 202 has an inverted L-shaped cross section, and has a support surface 202*a* for supporting the antenna unit 50. In the up-down direction, a position of the support surface 202*a* substantially matches a position of an upper surface of the flat plate portion 201*a*.

In this embodiment, in a central portion of the hanging portion 201*b* in the right-left direction, the two auxiliary stays 202 are provided to be separated from each other in the right-left direction. However, the number of the auxiliary stay 202 may be one or may be three or more when necessary. In addition, the auxiliary stay 202 is not an essential component, and thus the installation of the auxiliary stay 202 can be omitted.

Figure 8:
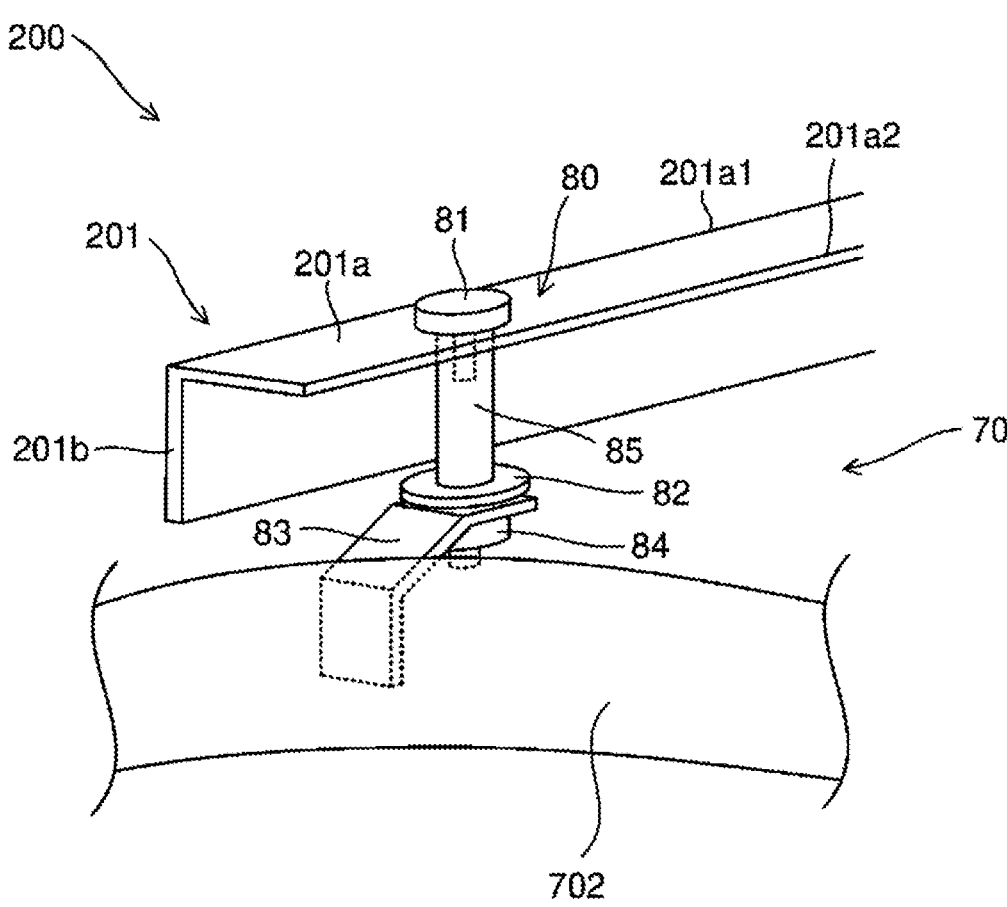
FIG. 8 is a perspective view schematically illustrating an area around a fixed portion of the support stay on the roof.
Figure 9:
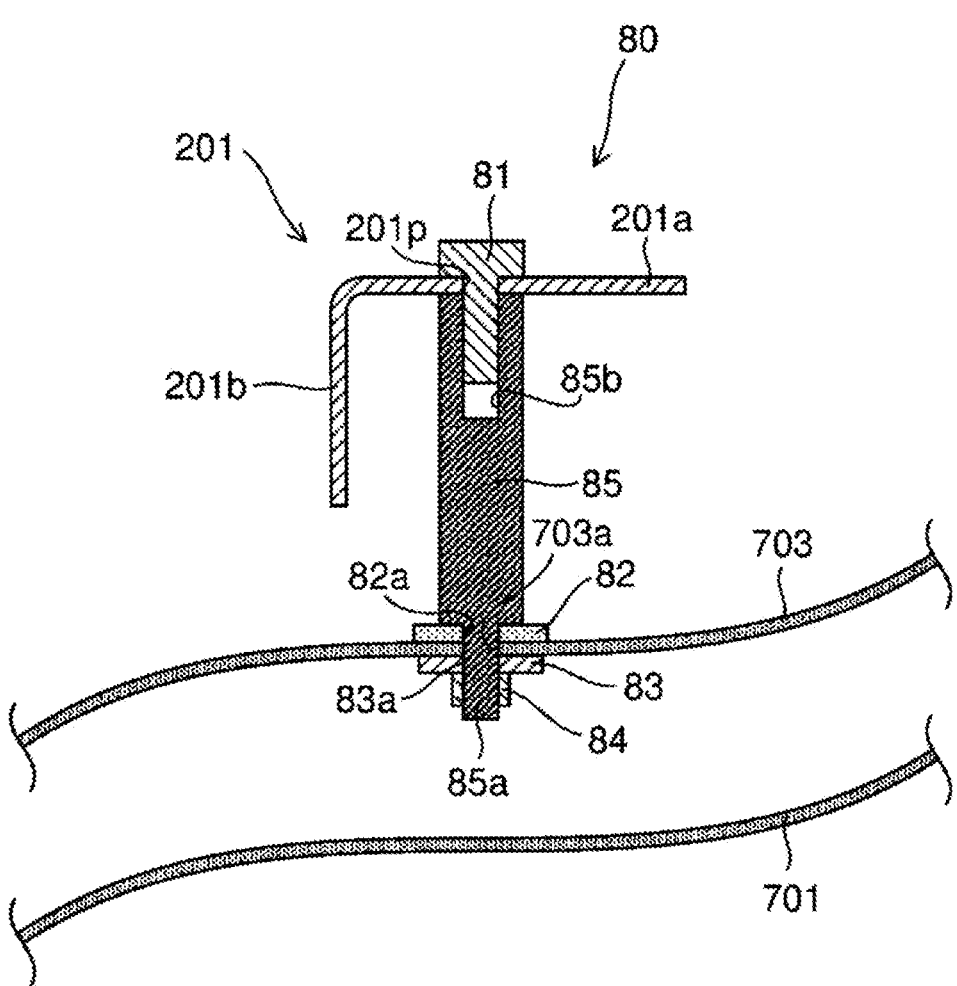
FIG. 9 is a cross-sectional view at the time when the support stay and the roof are cut along a plane that passes a roof fixing bolt in FIG. 8.

Next, a detailed description will be made on the method for fixing the support stay 200 to the roof 70. FIG. 8 is a perspective view schematically illustrating an area around a fixed portion of the support stay 200 on the roof 70. FIG. 9 is a cross-sectional view at the time when the support stay 200 and the roof 70 are cut along a plane that passes a roof fixing bolt 81 in FIG. 8. An inner roof 701 and the outer roof 703, which are illustrated in FIG. 9, are not illustrated in FIG. 8 for convenience.

The roof 70 has the inner roof 701, a fixing frame 702, and the outer roof 703. The inner roof 701 is located on an interior side of the cabin 7 in the roof 70. The inner roof 701 is fixed to the fixing frame 702 by an unillustrated fixing member (a stay, a bolt, a nut, or the like). The outer roof 703 is arranged above the inner roof 701 and is fixed to the fixing frame 702. That is, the roof 70 has: the inner roof 701; the fixing frame 702, to which the inner roof 701 is fixed; and the outer roof 703 arranged above the inner roof 701.

Figure 10:
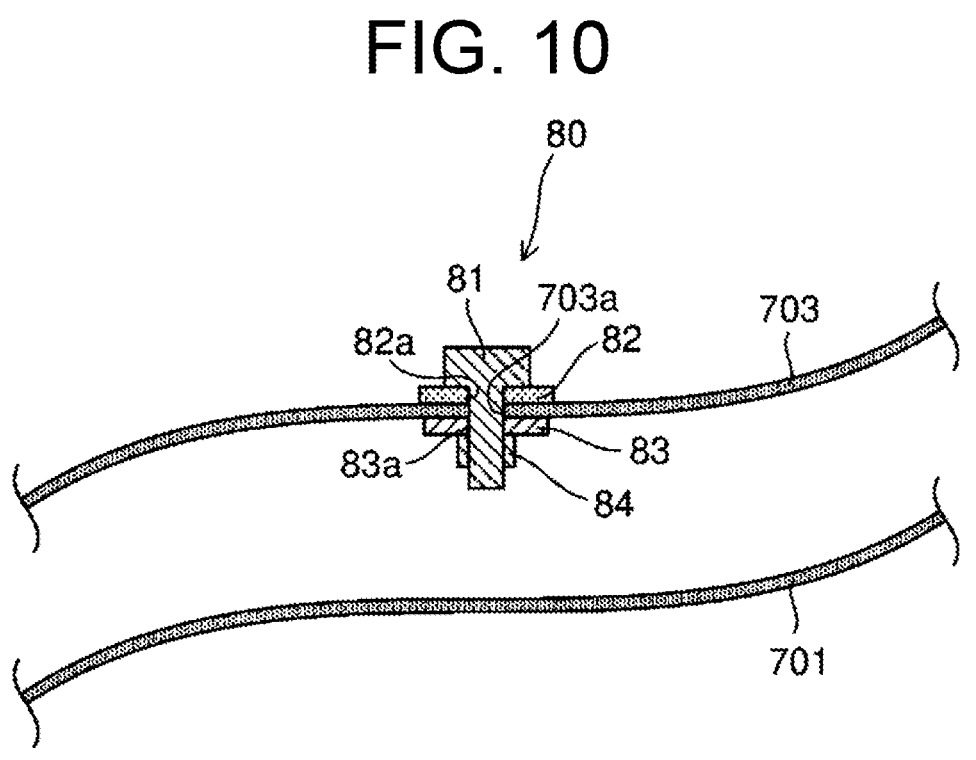

Here, a description will firstly be made on a fastening unit 80 that is used when only the outer roof 703 is fixed to the fixing frame 702 (see FIG. 8). FIG. 10 is a cross-sectional view of the fastening unit 80. The fastening unit 80 is configured to include the roof fixing bolt 81, a rubber washer 82, a coupling stay 83, and a nut 84.

The rubber washer 82 is provided to prevent entry of rain water above the roof 70 into the cabin 7. An opening 82*a*, through which the roof fixing bolt 81 is inserted, is provided at a center of the rubber washer 82.

The coupling stay 83 is a metal plate for coupling the outer roof 703 and the fixing frame 702 and has a shape that is bent at a specified position. The coupling stay 83 is provided with a through opening 83*a*. The roof fixing bolt 81 is inserted through the through opening 83*a*. A portion of the coupling stay 83 is fixed to the fixing frame 702 by welding or the like (see FIG. 8), and the portion is separated from the through opening 83*a*. The outer roof 703 is provided with a through-hole 703*a* through which the roof fixing bolt 81 is inserted.

Accordingly, as illustrated in FIG. 10, when the roof fixing bolt 81 is sequentially inserted through the opening 82*a* of the rubber washer 82, the through-hole 703*a* of the outer roof 703, and the through opening 83*a* of the coupling stay 83 from above and is screwed to the nut 84. In this way, the outer roof 703 can be fixed to the fixing frame 702. The outer roof 703 is fixed to the fixing frame 702 at plural positions by the fastening unit 80. Screwing described above means that the bolt is rotated and joined to the nut.

The support stay 200 can easily be fixed to the roof 70 by using a combination of the above-described fastening unit 80 and a spacer bolt 85 as a spacer member illustrated in FIG. 8 and FIG. 9.

The spacer bolt 85 has a projected portion 85*a* at a lower end in a rotational axis direction. The projected portion 85*a* penetrates the opening 82*a* of the rubber washer 82, the through-hole 703*a* of the outer roof 703, and the through opening 83*a* of the coupling stay 83, and is screwed to the nut 84. In addition, The spacer bolt 85 has a recessed portion 85*b* at an upper end in the rotational axis direction. A threaded groove is provided on an inner surface of the recessed portion 85*b*, and the roof fixing bolt 81 is inserted in and screwed to the recessed portion 85*b*.

Meanwhile, the flat plate portion 201*a* of the stay body 201 in the support stay 200 is provided with a through-hole 201*p*. The support stay 200 can be fixed to the spacer bolt 85 by inserting the roof fixing bolt 81 through the through-hole 201*p* and further screwing the roof fixing bolt 81 to the recessed portion 85*b* of the spacer bolt 85.

Thus, by using the spacer bolt 85, the support stay 200 can be held at a specified height position that is separated upward from the outer roof 703 by a height of the spacer bolt 85. The height of the spacer bolt 85 may be set appropriately according to a target height position of the antenna unit 50 above the roof 70. In addition, when the projected portion 85*a* of the spacer bolt 85 is sequentially inserted though the opening 82*a* of the rubber washer 82, the through-hole 703*a* of the outer roof 703, and the through opening 83*a* of the coupling stay 83 from above and is then screwed to the nut 84, the support stay 200, which is fixed to the spacer bolt 85, can be fixed to the fixing frame 702 together with the outer roof 703.

As described above, the outer roof 703 is coupled to the fixing frame 702 by the fastening unit 80. The fastening unit 80 includes the spacer bolt 85 that holds the support stay 200 at a specified height position from the outer roof 703.

Just as described, since the fastening unit 80 includes the spacer bolt 85, it is possible to easily fix the support stay 200 to the upper surface of the roof 70 by the spacer bolt 85 while effectively using the normal fastening unit 80 for fixing the outer roof 703 to the fixing frame 702. Thus, for example, when the support stay 200 is fixed to the roof 70, there is no need to perform work to additional provide a dedicated fixing hole for the support stay 200 in the upper surface of the roof 70.

In this embodiment, as illustrated in FIG. 7 and the like, a right end and a left end of the stay body 201 are fixed to the roof 70 (particularly, the outer roof 703) by the fastening units 80. That is, each of the ends of the stay body 201 in the right-left direction is fixed to the outer roof 703 by the fastening unit 80 that includes the spacer bolt 85. In this way, the support stay 200, which extends in the right-left direction, can stably be fixed to the outer roof 703.

As illustrated in FIG. 6, in the configuration to support the antenna unit 50 by the flat plate portion 201a of the support stay 200, at a position behind the hanging portion 201b, the harness WH, which electrically connects the antenna unit 50 and the control unit 23 (see FIG. 2), is desirably drawn and located in the right-left direction from the antenna unit 50.

In the case where the harness WH is arranged at the position behind the hanging portion 201b of the support stay 200, during routing of the harness WH, the hanging portion 201b hides the harness WH when seen from the front. Thus, it is possible to reduce a chance of occurrence of a situation where external appearance quality is degraded due to exposure of the harness WH.

The embodiment of the present invention has been described above, but the scope of the invention is not limited thereto. The invention can be carried out within an extended or modified range without departing from the gist of the invention.

INDUSTRIAL APPLICABILITY

The present invention can be used for the work vehicles such as the tractor.

REFERENCE SIGNS LIST

1 Tractor (work vehicle)
2 Vehicle body
23 Control unit
7 Cabin
45 Positioning satellite
50 Antenna unit (positioning device)
70 Roof
70F Roof front end
70H Roof uppermost end
71R Right front pillar
71L Left front pillar
80 Fastening unit
85 Spacer bolt (spacer member)
100 Support mechanism
101R Right stay
101L Left stay
102 Support pipe (support member)
103 Seating
200 Support stay
201 Stay body
201a Flat plate portion
201b Hanging portion
701 Inner roof
702 Fixing frame
703 Outer roof
WH Harness

The invention claimed is:
1. A work vehicle including:
a vehicle body;
a cabin that is mounted on the vehicle body and has a roof, the roof has:
a roof front end that is located in a forefront portion in a front-rear direction; and a roof uppermost end that is located behind the roof front end and is located higher than the roof front end;
a positioning device that is located directly above a portion of an exterior surface of the roof of the cabin and is configured to detect a position of the vehicle body based on a signal transmitted from a positioning satellite,
wherein a position of an uppermost end of the positioning device is lower than a position of the roof uppermost end when the positioning device is in use.
2. The work vehicle according to claim 1, wherein the position of the positioning device is higher than a position of the roof front end.
3. The work vehicle according to claim 1, wherein the positioning device is located in front of the roof uppermost end.
4. The work vehicle according to claim 1, further comprising:
a support mechanism that supports the positioning device, wherein:
the cabin has:
a right front pillar that is coupled to the vehicle body and is configured to support a right front portion of the roof; and
a left front pillar that is coupled to the vehicle body and is configured to support a left front portion of the roof,
the support mechanism has:
a right stay and a left stay that are respectively attached to the right front pillar and the left front pillar;
a support member that extends in a right-left direction at a position above the roof and has ends fixed to the right stay and the left stay; and
a seating that is fixed, at a position above the roof, to the support member, and
the positioning device is fixed to the seating.
5. The work vehicle according to claim 4, further comprising:
a control unit to which position information of the vehicle body is input via a harness, the position information of the vehicle body being detected by the positioning device,
wherein the harness is arranged along the right front pillar or the left front pillar.
6. The work vehicle according to claim 1, further comprising:
a support stay that is fixed to an upper surface of the roof and is configured to support the positioning device.
7. The work vehicle according to claim 6, wherein the roof has:
an inner roof;
a fixing frame to which the inner roof is fixed; and
an outer roof that is arranged above the inner roof, the outer roof is coupled to the fixing frame by a fastening unit, and the fastening unit has a spacer member configured to hold the support stay at a specified height position from the outer roof.
8. The work vehicle according to claim 7, wherein:
the support stay has a stay body that extends in a right-left direction at a position above the roof, and
each end portion of the stay body in the right-left direction is fixed to the outer roof by the fastening unit including the spacer member.
9. The work vehicle according to claim 8, further comprising:

a control unit to which position information of the vehicle body is input via a harness, the position information of the vehicle body being detected by the positioning device, wherein the stay body has:

a flat plate portion that extends in the right-left direction and is configured to support the positioning device from below; and a hanging portion that extends in the right-left direction and hangs down from a front end portion or a rear end portion of the flat plate portion, and at a position behind the hanging portion, the harness is drawn and located in the right-left direction from the positioning device.

10. The work vehicle according to claim 1, wherein the position of the positioning device is higher than a position of the roof rear end.

11. The work vehicle according to claim 1, wherein a front end of the positioning device is at substantially a same height as a rear end of the positioning device.

12. The work vehicle according to claim 1, wherein the roof further has a roof rear end that is located in a rearmost portion in the front-rear direction, and the roof uppermost end is located in front of and higher than the roof rear end.

* * * * *